(No Model.)

H. M. HOWELL.
NUT LOCK.

No. 502,363.  Patented Aug. 1, 1893.

WITNESSES:  INVENTOR
Hugh M. Howell
BY
ATTORNEY.

UNITED STATES PATENT OFFICE.

HUGH M. HOWELL, OF DENVER, COLORADO.

NUT-LOCK.

SPECIFICATION forming part of Letters Patent No. 502,363, dated August 1, 1893.

Application filed August 8, 1892. Serial No. 442,462. (No model.)

*To all whom it may concern:*

Be it known that I, HUGH M. HOWELL, a citizen of the United States of America, residing in the city of Denver, in the county of Arapahoe and State of Colorado, have invented new and useful Nut-Locks, of which the following, taken in connection with the accompanying drawings, is a specification.

This invention is one of that class of nut locks which can be used singly or can be used where bolts with nuts are placed in pairs as at either end of fish plates or angle bars joining two railroad rails or nuts upon each point of a staple, or nuts upon bolts used on cars, wagons or other vehicles or machinery of any kind, or nuts upon bolts used in any manner, either in pairs or otherwise, and the object of this invention is to prevent the nut being turned upon the bolt.

To this end, the said invention consists of two or more pieces of sheet metal, each somewhat longer than the distance between the bolts or nuts, with an elongated hole for the bolt near one end, and at the other end a wrench shaped opening, or an opening of such shape as to fit the angle of the nut that may be used, whether square, hexagon or otherwise, the said opening fitting the angles or sides of the nut like an open wrench, and which when placed in position, will form a lock which will hold the nut in place and prevent it from turning on the bolt. The top or binding nut lock has, alongside of the elongated hole where the bolt fits in, a slot through the metal sheet, and into the slot is driven a metallic nail or pin, going in at one side of the nut and coming out at the other, bending slightly by the operation. For the purpose of driving this nail or pin a nut with scalloped shaped recesses on each side of the nut on the lower edge sufficient to receive the ends of the pin or nail is preferable.

Similar figures refer to similar parts throughout the several views.

Figure 1:
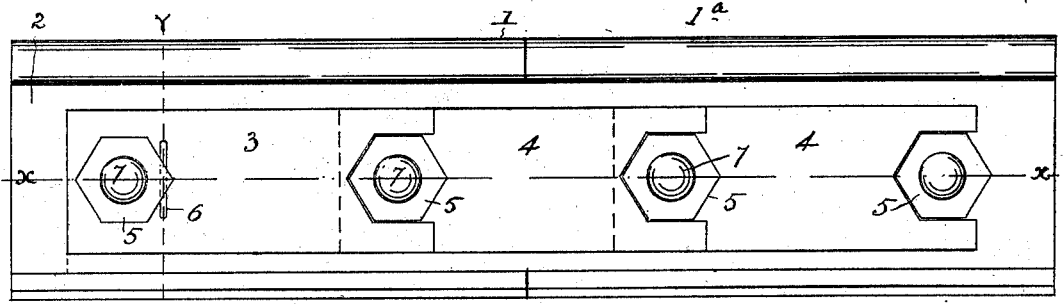

The accompanying drawings fully illustrate the different parts of said nut locks, and are described as follows, to-wit:

Figure 1 is a side elevation view of a portion of two railroad rails joined by fish plates and secured by bolts and nuts, with my nut locks placed thereon. 1 and 1ª represent the two rails, 2 the fish plates, 3 the upper metal sheet which forms the top or binding nut lock, 4—4 the under nut locks, 5 the nuts on the bolts which may be square, hexagon or other shaped, 6 the metallic nail or pin which keeps the nut on nut lock 3 from turning on the bolt, and 7 the bolts running through the fish plates and rail and holding them together.

Figure 2:
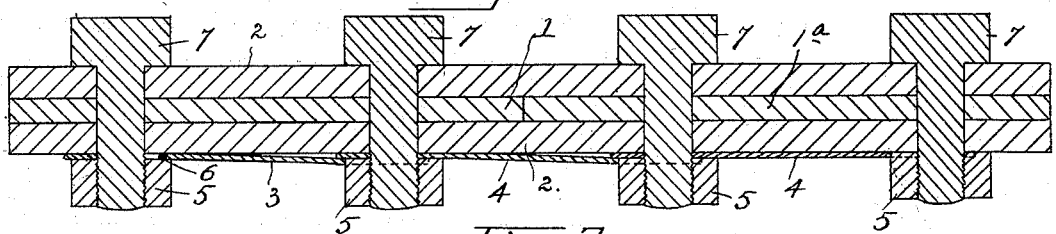

Fig. 2 represents a horizontal section along the line $x$—$x$.

Figure 3:
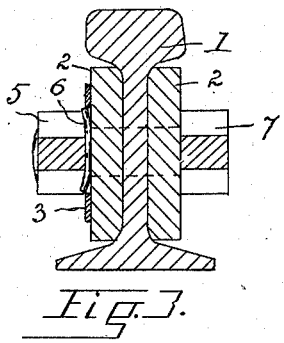

Fig. 3 represents the cross section through on the dotted line marked in Fig. 1 $y$—$y$, and shows the method of locking the bolt on the top or binding nut lock 3, with the metallic nail or pin 6.

Figure 4:
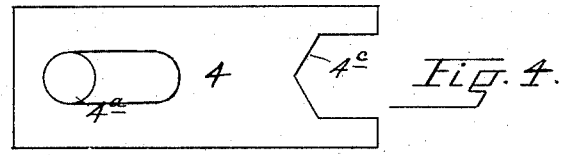

Fig. 4 represents a view of the metal sheet or plate 4, with elongated bolt hole 4ª and wrench shaped opening 4ᶜ at the other end, which said wrench shaped opening fits on to the nuts 5 and prevents them from turning. The metal sheets making the nut locks for those under the top nut lock 3, are all of the shape as described in Fig. 4, excepting that where a square nut is used, the wrench shaped aperture at the end, would be shaped to fit the nut.

Figure 5:
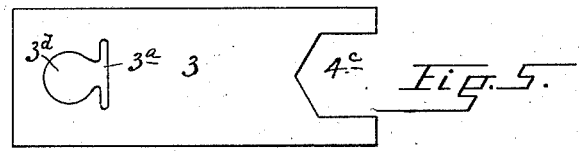

Fig. 5 represents a view of the top or binding metal sheet, making the top or binding nut lock. It is the same as that represented in Fig. 4, excepting that a small slot 3ª, the length of the angles of the nut, is made alongside the bolt hole, and through the metal sheet. When the nut is screwed in place on the bolt on this metal sheet, a metal nail or pin is driven from above the nut and into this slot, coming out below the nut, as shown by No. 6 in Figs. 1 and 3, the nail or pin being slightly curved or bent when so driven.

The metal sheets as shown in Figs. 4 and 5 (being Nos. 3 and 4 in Fig. 1) may be made of any kind of iron or steel, in such form as to fit any shape of nut that may be used, the result to be obtained being, that near one end of the sheet, shall be an elongated hole fitting onto a bolt 3ᵈ, and at the other end an opening that will enable the metal sheet to hold in place, as if with a wrench, the nut on the next bolt so as to prevent the nut from turning; but the top or binding sheet 3, must in all cases have the slot 3ª, which receives the metallic nail or pin 6. The metal sheet used for the top or binding nut lock 3, and also where used singly, should be as thick as the metallic nail or pin 6. The metallic pin or nail 6, can be made of any wrought metal that will bend or curve on being driven between the angles of one side of the nut 8 through the slot 3ª Fig. 5, and coming out on the opposite side of the nut.

This nut lock may be used in the construction of cars, wagons or other vehicles or wherever two or more nuts are used.

What I claim, and desire to secure by Letters Patent, is—

In a nut lock, the combination of a series of bolts and nuts; a plate 4 having a nut shaped recess 4ᶜ in one end—and an oblong bolt opening in the other end; a plate 3 having a nut shaped recess 4ᶜ in one end and a bolt opening 3ᵈ near the other end, and a slot 3ª intersecting the bolt opening 3ᵈ—a pin 6, adapted to enter and lie in said slot 3ª and engage the edges of a superposed nut 5 all constructed and arranged to operate as shown and described.

HUGH M. HOWELL.

Witnesses:
THOS. W. LIPSCOMB,
MARCUS C. DAILEY.